(12) United States Patent
Feldmeier

(10) Patent No.: US 8,528,713 B2
(45) Date of Patent: *Sep. 10, 2013

(54) FREEWHEEL INSERT ELEMENT AND FREEWHEEL

(75) Inventor: Fritz Feldmeier, Nuremberg (DE)

(73) Assignee: Paul Mueller GmbH & Co. KG Unternehmensbeteiligungen, Nuremberg (DE)

( * ) Notice: Subject to any disclaimer, the term of this patent is extended or adjusted under 35 U.S.C. 154(b) by 112 days.

This patent is subject to a terminal disclaimer.

(21) Appl. No.: 12/998,906

(22) PCT Filed: Dec. 17, 2009

(86) PCT No.: PCT/DE2009/075076
§ 371 (c)(1), (2), (4) Date: Jun. 15, 2011

(87) PCT Pub. No.: WO2010/069308
PCT Pub. Date: Jun. 24, 2010

(65) Prior Publication Data
US 2011/0240434 A1 Oct. 6, 2011

(30) Foreign Application Priority Data
Dec. 19, 2008 (EP) .................. 08172346

(51) Int. Cl.
*F16D 41/07* (2006.01)

(52) U.S. Cl.
USPC ........................ 192/45.1; 192/41 A

(58) Field of Classification Search
USPC .............. 192/45.1, 41 A; 188/82.8
See application file for complete search history.

(56) References Cited

U.S. PATENT DOCUMENTS

| 2,520,004 | A |   | 8/1950 | Gondek |
| 2,614,670 | A | * | 10/1952 | Heintz ............ 192/45.1 |
| 2,624,436 | A | * | 1/1953 | Gamble .......... 192/45.1 |
| 2,793,729 | A |   | 5/1957 | Cobb |
| 2,803,324 | A |   | 8/1957 | Dodge |
| 2,812,839 | A | * | 11/1957 | Cobb ............. 192/45.1 |
| 3,324,980 | A |   | 6/1967 | Rojic et al. |
| 4,327,822 | A |   | 5/1982 | Vögele et al. |
| 4,998,605 | A | * | 3/1991 | Ferris ............ 192/41 A |
| 5,052,533 | A | * | 10/1991 | Carey et al. .... 192/41 A |

(Continued)

FOREIGN PATENT DOCUMENTS

| DE | 40 32 915 | 4/1992 |
| JP | 2008-014427 | 1/2008 |
| WO | WO 03/072968 | 9/2003 |

OTHER PUBLICATIONS

International Search Report of PCT/DE2009/075076, May 7, 2010.

*Primary Examiner* — Richard M. Lorence
(74) *Attorney, Agent, or Firm* — Collard & Roe, P.C.

(57) ABSTRACT

The invention relates to a freewheel insert element and a freewheel comprising a freewheel insert element, wherein the freewheel insert element comprises a plurality of clamping bodies (1, 11), each clamping body (1, 11) having an outer contact surface (1a, 11a) for forming a frictional contact with an outer clamping track (3) and an inner contact surface (1b, 11b) for forming a frictional contact with an inner clamping track (4), and a plurality of intermediate elements (2, 2a, 2b) are provided which have a higher elasticity than the clamping bodies (1, 11) and are arranged between adjacent clamping bodies (1, 11).

15 Claims, 3 Drawing Sheets

(56) References Cited

U.S. PATENT DOCUMENTS

| | | | |
|---|---|---|---|
| 5,445,255 A * | 8/1995 | Rutke et al. ............... 192/45.1 |
| 5,607,036 A * | 3/1997 | Costin ....................... 192/45.1 |
| 7,506,738 B2 | 3/2009 | Muramatsu et al. |
| 2011/0244969 A1 * | 10/2011 | Feldmeier .................... 464/82 |

\* cited by examiner

1

FREEWHEEL INSERT ELEMENT AND FREEWHEEL

CROSS REFERENCE TO RELATED APPLICATIONS

This application is the National Stage of PCT/DE2009/075076 filed on Dec. 17, 2009, which claims priority under 35 U.S.C. §119 of European Application No. 08172346.2 filed on Dec. 19, 2008, the disclosure of which is incorporated by reference. The international application under PCT article 21(2) was not published in English.

The invention relates to a freewheel insert element and to a freewheel. Freewheel insert elements are used in freewheels, i.e. in directional couplings, which transmit or support a torque in one direction by means of a non-positive connection and permit idling in the opposite direction. In the case of freewheels with clamping bodies, the clamping bodies are in the "clamping position" when they transmit the torque non-positively, i.e. in a frictional manner, and are in the "freewheel position" when they permit idling.

In conventional freewheels with clamping bodies, the freewheel insert element consists of the following three elements: the clamping bodies, the cage and the springs. The clamping bodies can be brought by means of spring force into contact with an outer and an inner cylindrical clamping track. The clamping bodies are kept wedged at the same distance on the circumference in a "cage", wherein a spring force which is supported on the cage acts on each clamping body. Such freewheel insert elements of the known type therefore consist of at least three different components, this entailing a correspondingly high outlay on manufacturing.

It is the object of the present invention to make available a particularly simply constructed freewheel insert element and a particularly simply constructed freewheel.

This object is achieved for the freewheel element by the features of patent claim 1. Advantageous embodiments of the freewheel element are described in dependent claims 2-12. For the freewheel, the object is achieved by the features of patent claim 13.

Advantageous embodiments of the freewheel are described in dependent claims 14 and 15.

The freewheel insert element according to the invention has a multiplicity of clamping bodies, wherein each clamping body has an outer contact surface for forming frictional contact with an outer clamping track, and an inner contact surface for forming frictional contact with an inner clamping track, and wherein a multiplicity of intermediate elements is provided, said intermediate elements being more elastic than the clamping bodies and being arranged between adjacent clamping bodies.

By means of such a construction, the cage and the springs can be omitted, this resulting in a particularly simply constructed freewheel insert element which is simple to manufacture. The greater elasticity of the intermediate elements in comparison to the clamping bodies increases the deformability of the clamping bodies within the freewheel insert element and the deformability of the freewheel insert element itself.

The clamping bodies preferably consist of a metallic material, for example of a steel material. The intermediate elements accordingly then have an elasticity which is greater than the elasticity of metallic materials.

The material or the materials from which the intermediate element is constructed preferably have a Shore hardness of 30 Shore A to 80 Shore A. The Shore hardness is a widely used characteristic variable for testing plastics and elastomers and is described in the standards DIN 53505, ISO 868 and ISO 7619.

In an advantageous manner, the intermediate elements are designed so as to fix the clamping bodies in position and to cushion said clamping bodies. By means of simultaneous fixing and cushioning of the clamping bodies by the intermediate elements, a particularly compact construction of the freewheel insert element is possible.

If the intermediate elements consist of an elastic material having high internal damping, for example of natural rubber, then the tilting movement upon coiling of the clamping bodies leads to deformation of the damping material of the intermediate elements, which material is arranged between the clamping bodies, and therefore to dissipation of vibrational energy, this leading to particularly pronounced damping by the freewheel element.

In one advantageous embodiment, the intermediate elements are connected to the clamping bodies. In particular, the intermediate elements can be connected to the clamping bodies in a cohesively bonded manner, this leading to a particularly reliable and stable bond between the intermediate elements and clamping bodies and thereby, for example, improving the handleability of the freewheel insert element. The connection in a cohesively bonded manner can be designed here, for example, as an adhesive connection. The intermediate elements may also be configured as a casting compound or a plurality of casting compounds and the connection in a cohesively bonded manner may be produced by a casting process in which the clamping bodies are—at least partially—enclosed by the casting compound or casting compounds. It is also possible to produce the intermediate elements from an injection molding compound or injection molding compounds and to connect the intermediate elements to the clamping bodies with the aid of an injection molding process.

In a further advantageous embodiment, the intermediate elements correspond in contour to the contour of the adjacent clamping bodies. Such a configuration of the contour permits a particularly reliable connection between the intermediate element and the clamping bodies adjacent thereto.

In an advantageous manner, the intermediate elements can consist of a plurality of different materials. It is firstly possible in this case for, for example, intermediate elements which are adjacent to one another to consist of different materials, and, secondly it is also possible for one intermediate element itself to be constructed from different materials. Overall, the variability and adaptability of the freewheel element to various fields of use are increased as a result.

In a further advantageous embodiment, the elasticity of at least one intermediate element varies along the direction from the inner clamping track to the outer clamping track. This variation in the elasticity can be achieved, for example, by the intermediate element being constructed from different materials or by a gradual variation in the elasticity of the material used. The variation in the elasticity likewise increases the adaptability of the freewheel insert element.

Depending on the desired field of use and on the desired elasticity, in preferred embodiments the intermediate elements can be produced at least partially from silicone material, from thermoplastic polymers, from vulcanized natural rubber, from thermosetting polymers (for example synthetic resin) from elastomers or from a mixture of the abovementioned materials. All of the intermediate elements here may have the same material composition. However, it is also possible to vary the material composition from intermediate element to intermediate element. This increases the variability of the freewheel insert element and the adaptability thereof to various applications.

In a further advantageous embodiment, the freewheel insert element is of strip-shaped design. By this means, the freewheel insert element can be produced as an endless strip. Depending on the production, the freewheel insert element can then be divided to the desired peripheral length and placed between an inner contact surface and an outer contact surface.

In a further advantageous embodiment, the freewheel insert element is of annular design. As a result, the freewheel insert element can be installed particularly simply in a freewheel and permits frictional contact over the entire circumference of the outer and inner clamping track.

The freewheel according to the invention has an inner ring, the outer casing surface of which forms an inner clamping track, and an outer ring, the inner casing surface of which forms an outer clamping track, and a freewheel insert element according to the invention arranged between the inner clamping track and the outer clamping track.

In a preferred embodiment of the freewheel, at least one part of the clamping bodies is connected in the clamping position thereof to the intermediate elements. In particular, clamping bodies can be arranged relative to the intermediate elements in such a manner, i.e., for example, can be embedded in the intermediate elements, that the clamping bodies are tilted about the clamping angle thereof in relation to the clamping tracks.

In a further embodiment, at least one part of the clamping bodies can be connected in the freewheel position thereof to the intermediate elements.

In freewheel insert elements or in freewheels which are operated a great deal in the freewheel mode, the intermediate elements are composed in a particularly preferred manner of highly elastic material in order to keep the friction between the clamping bodies and clamping tracks low.

The invention is explained in more detail with reference to exemplary embodiments in the figures of the drawings, in which.

Figure 1:
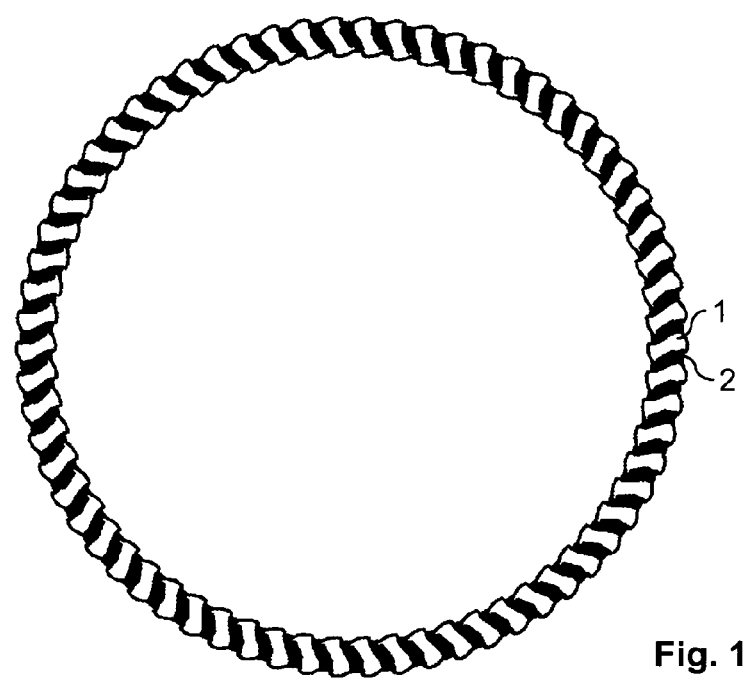
FIG. 1 shows a first embodiment of the freewheel insert element.

FIG. 1 shows a freewheel insert element with a multiplicity of clamping bodies 1 and intermediate elements 2, wherein, in the figures, only one clamping body 1 and one intermediate element 2 in each case are provided with a reference number as a rule. The freewheel insert element 1 is of annular design and the clamping bodies 1 and the intermediate elements 2 are distributed uniformly over the circumference.

Figure 2:
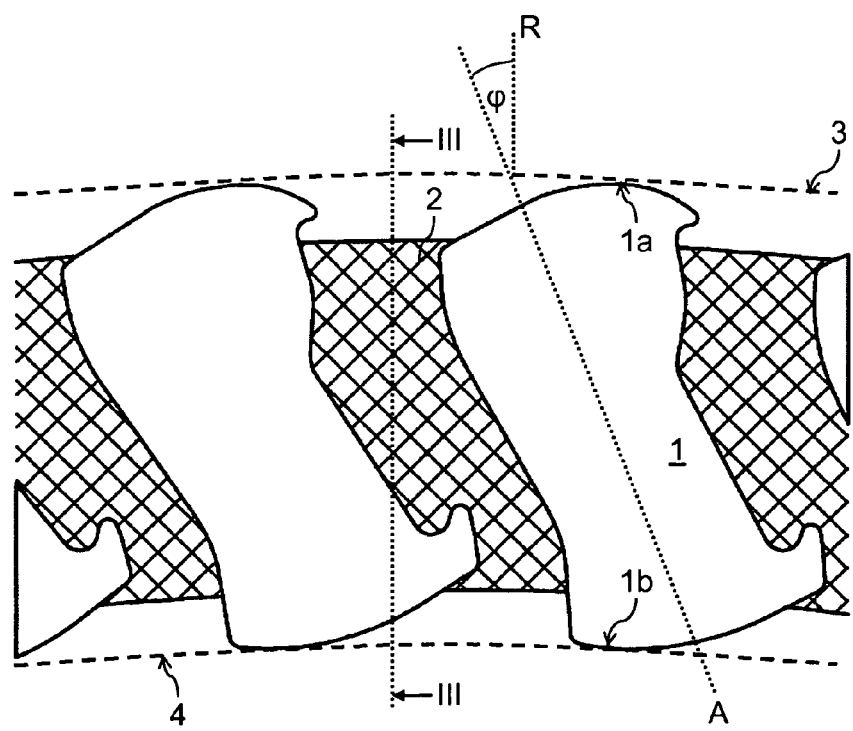
FIG. 2 shows an enlarged detail of the freewheel insert element illustrated in FIG. 1.

FIG. 2 shows an enlarged detail from FIG. 1. The clamping body 1 has an outer contact surface 1$a$ for forming frictional contact with an outer clamping track 3, and an inner contact surface 1$b$ for forming frictional contact with an inner clamping track 4. An intermediate element 2 is located in each case between the clamping bodies 1. The clamping body 1 tilted with respect to the outer clamping track 3 or the inner clamping track 4 is embedded here in the intermediate elements 2. In other words, the clamping body axis A of the clamping body 1 is not oriented in the radial direction but rather encloses the angle φ with the radial direction R.

Figure 3:
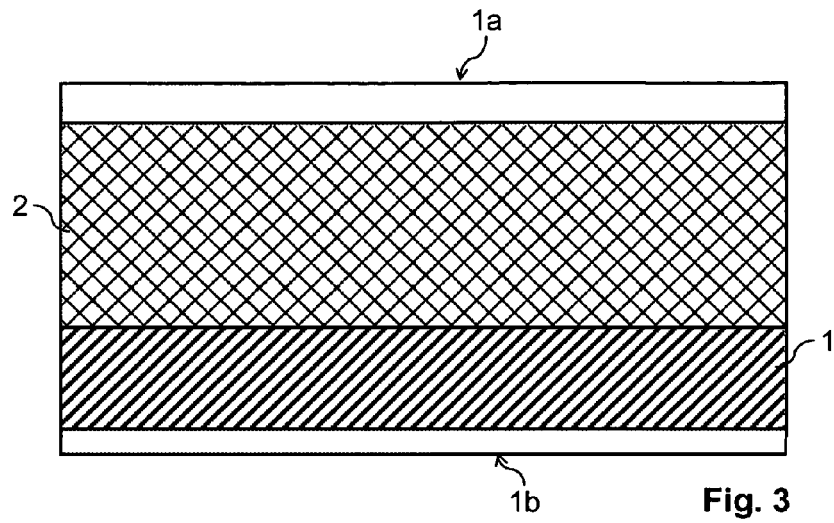
FIG. 3 shows a sectional illustration of the freewheel insert element illustrated in FIG. 2.

FIG. 3 shows a sectional illustration along the sectional surface III-III shown in FIG. 2. The intermediate element 2 has an axial extent which corresponds to the axial extent of the clamping body 1. A particularly compact freewheel insert element can be produced by restricting the extent of the intermediate element 2 in the axial direction to the extent of the clamping body 1.

In a further embodiment which is not illustrated in the figures of the drawing, the intermediate element 2 can also protrude over the clamping body 1 in the axial direction. This leads to a particularly positionally stable arrangement of the individual clamping bodies 1 within the intermediate elements 2.

Figure 4:
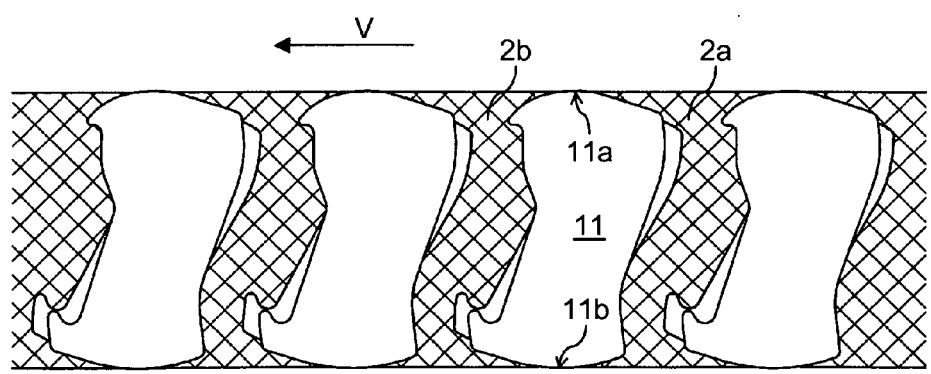
FIG. 4 shows a second embodiment of the freewheel insert element.

FIG. 4 shows a detail from a second embodiment of the freewheel insert element. The freewheel insert element illustrated in FIG. 4 is of strip-shaped design and can be divided to the desired peripheral length and placed between an inner contact surface 4 (not illustrated in FIG. 4) and an outer contact surface 3 (not illustrated in FIG. 4).

In contrast to the freewheel insert element illustrated in FIG. 1 and FIG. 2, the intermediate element 2 substantially completely fills the space positioned in the circumferential direction between two adjacent clamping bodies 11 such that the contour of the clamping body 11 as far as the outer contact surface 11$a$ and the inner contact surface 11$b$ is completely in contact with the intermediate element 2$a$ or 2$b$.

FIG. 4 shows the clamping bodies 11 simultaneously in the freewheel position thereof and in the clamping position thereof—partially superimposed on the freewheel position. The clamping bodies 11 are in the clamping position if the outer contact surface 1$a$ is rotated in the direction of rotation V relative to the inner contact surface 1$b$ by formation of frictional contact and the two contact surfaces 1$a$ and 1$b$ form frictional contact with the clamping tracks (not illustrated in FIG. 4). The intermediate elements 2 located adjacent to the respective clamping bodies—for example the intermediate elements 2$a$ and 2$b$ with respect to the clamping body 11 provided with a reference number in FIG. 4—are fixedly connected to the clamping body and are correspondingly deformed owing to their elastic material behavior upon displacement of the clamping body 11 from the freewheel position thereof into the clamping position thereof or upon displacement of said clamping body from the clamping position into the freewheel position.

It is furthermore possible to produce the intermediate elements 2$a$ and 2$b$ which are located adjacent to each other from different materials, in particular from materials having differing elasticity.

Figure 5:
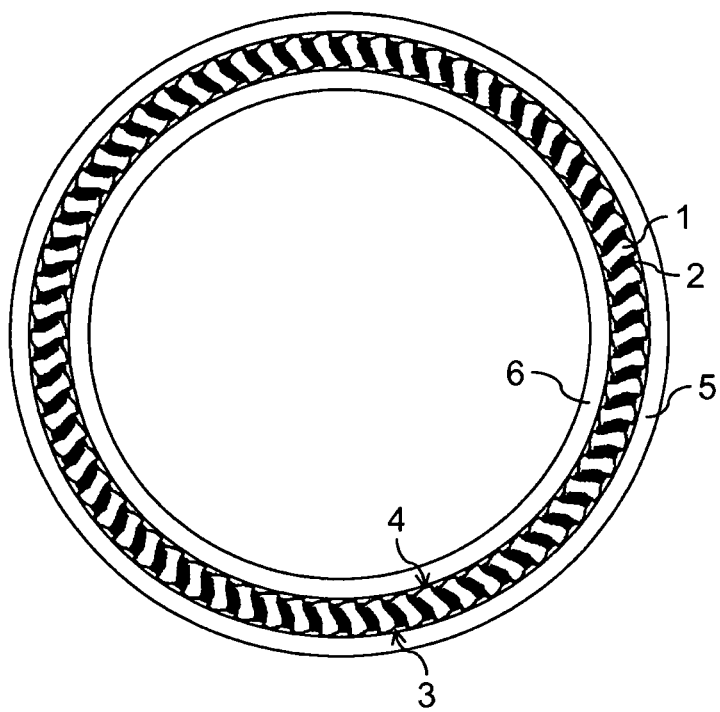
FIG. 5 shows a freewheel.

FIG. 5 shows a freewheel with a freewheel insert element which consists of a multiplicity of clamping bodies 1 and intermediate elements 2. The inner casing surface of the outer ring 5 forms the outer clamping track 3. The outer casing surface of the inner ring 6 forms the inner clamping track 4. The inner ring 6 and the outer ring 5 are arranged concentrically with respect to each other, and the freewheel insert element with the clamping bodies 1 and the intermediate elements 2 is fitted between the outer clamping track 3 and the inner clamping track 4.

LIST OF DESIGNATIONS

1 Clamping body
1$a$ Outer contact surface
1$b$ Inner contact surface
2, 2$a$, 2$b$ Intermediate element
3 Outer clamping track
4 Inner clamping track 5 Outer ring
6 Inner ring
11 Clamping body
11*a* Outer contact surface
11*b* Inner contact surface
A Clamping body axis
R Radial direction
V Direction of rotation
φ Angle

The invention claimed is:

1. A freewheel insert element with a multiplicity of clamping bodies, wherein each clamping body has an outer contact surface for forming frictional contact with an outer clamping track, and an inner contact surface for forming frictional contact with an inner clamping track, wherein a multiplicity of intermediate elements is provided, said intermediate elements being more elastic than the clamping bodies and being arranged between adjacent clamping bodies, and
    wherein the intermediate elements which are adjacent to one another consist of different materials.

2. The freewheel insert element as claimed in claim 1, wherein the intermediate elements are designed so as to fix the clamping bodies in position and to cushion said clamping bodies.

3. The freewheel insert element as claimed in claim 1, wherein the intermediate elements are cohesively bonded to the clamping bodies.

4. The freewheel insert element as claimed in claim 1, wherein the intermediate elements correspond in contour to the contour of the adjacent clamping bodies.

5. The freewheel insert element as claimed in claim 1, wherein an intermediate element itself of the multiplicity of intermediate elements is constructed of different materials.

6. The freewheel insert element as claimed in claim 1, wherein the elasticity of at least one intermediate element varies along the direction from the inner clamping track to the outer clamping track.

7. The freewheel insert element as claimed in claim 1, wherein the intermediate elements are at least partially composed of a silicone.

8. The freewheel insert element as claimed in claim 1, wherein the intermediate elements are at least partially composed of a thermoplastic polymer.

9. The freewheel insert element as claimed in claim 1, wherein the intermediate elements are at least partially composed of a vulcanized natural rubber.

10. The freewheel insert element as claimed in claim 1, wherein the intermediate elements are at least partially composed of a synthetic resin.

11. The freewheel insert element as claimed in claim 1, wherein the freewheel insert element is of strip-shaped design.

12. The freewheel insert element as claimed in claim 1, wherein the freewheel insert element is of annular design.

13. A freewheel, comprising an inner ring, an outer casing surface of the inner ring forming an inner clamping track, comprising an outer ring, an inner casing surface of the outer ring forming an outer clamping track, and comprising a freewheel insert element as claimed in claim 1 arranged between the inner clamping track and the outer clamping track.

14. The freewheel as claimed in claim 13, wherein at least one part of the clamping bodies is connected in a clamping position thereof to the intermediate elements.

15. The freewheel as claimed in claim 13, wherein at least one part of the clamping bodies is connected in a freewheel position thereof to the intermediate elements.

* * * * *